Jan. 30, 1962  B. L. FARLEY  3,018,586
ORNAMENTAL APPARATUS FOR SOILLESS HYDROPONIC CULTIVATION
Filed May 26, 1959
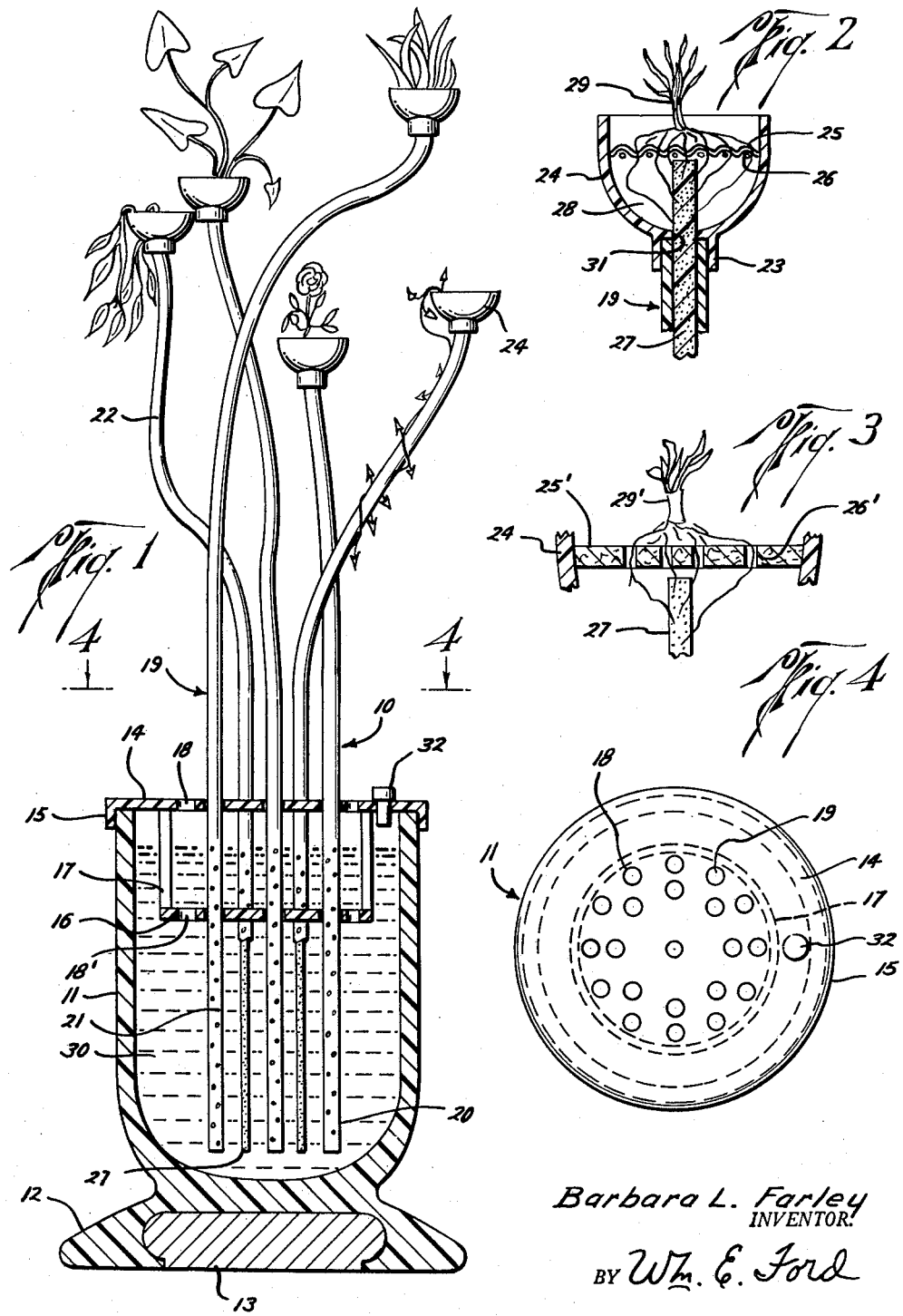
Barbara L. Farley
INVENTOR.
BY Wm. E. Ford
ATTORNEY

3,018,586
ORNAMENTAL APPARATUS FOR SOILLESS HYDROPONIC CULTIVATION
Barbara Lane Farley, 1117 Nantucket Drive, Houston 27, Tex.
Filed May 26, 1959, Ser. No. 815,879
5 Claims. (Cl. 47—1.2)

This invention relates to an apparatus for cultivating plants by the hydroponic method without the use of soil, gravel, sand, or other earthen components, the nutrient for plants thus cultivated passing upwardly thereto through a porous wick material.

In previous methods of cultivating plants that have been self-watered through capillary action to transfer the water into position to serve the roots of the plants cultivated, it has been the practice to embed the roots in earthen components such as soil and it has also been the practice, in most cases, to employ the soil as the nutrient transporting medium. Otherwise, in cases where soil has not been used with the hydroponic method, a material such as sponge rubber or other corresponding element has been employed to accomplish the same object as soil. Thus the soil comprises the transporting element for the nutrient and/or water and additionally such element has been selected to be of size to receive the plant roots to be fully embedded therein. In this manner the transporting medium has had to be of such size or volume as to stand out as a special structure. In such cases, the direction of root growth has not been capable of control and the plant supporting medium has had to be completely discarded without alteration in cases where changes of condition may have been required.

This invention has as a primary object the provision of apparatus and method of soilless hydroponic cultivation wherein the simplest structure as a plastic mesh or pasteboard disc is all that is required to support the plant. Thus the supports employed in this invention do not set out to serve any other function than that of a simple support or spacing element to space the plants supported with relation to the rest of the apparatus with the consequence that no consideration need be given to such support as a root receiving medium.

It is another object of this invention to provide apparatus and method of this class in which the nutrient for the plants is passed upwardly thereto through a porous wick material which receives therein the roots of plants supported by tubes which contain such wick material.

It is yet another object of this invention to provide method and apparatus of this class in which the plant supporting tubes may be of highly ornamental appearance and employed selectively in various patterns of plant arrangement.

It is yet a further object of this invention to provide method and apparatus of this class in which the parts are selectively interchangeable for employment in diverse motifs of usage, the apparatus being adapted to be provided from a vast number of materials which are thus universally available.

Other and further objects will be apparent when the specification herein is considered in connection with the drawings in which:

FIG. 1 is a sectional elevation of one embodiment of the apparatus employed in the practice of the invention;

FIG. 2 is a sectional elevation in enlarged detail showing a cup structure used in the employment of the invention with one form of plant support included;

FIG. 3 is an enlarged sectional elevation showing another form of plant support and spacer means; and FIG. 4 is a plan view taken along line 4—4 of FIG. 1.

Referring in detail to the drawings, in which like reference numerals are assigned to like elements in the various views, an apparatus 10 is shown in FIG. 1, designed for the soilless hydroponic cultivation of plants, such apparatus including a container 11 having a base 12 weighted centrally at 13 with a material such as lead. A cover 14 is provided for the container having a downwardly turned flange 15 around the top thereof to fit upon the top rim surface of the container. The lid 14 has a bore therein normally plugged by a plug 32 so that the container may be filled with nutrient and so that a desired level of nutrient may be maintained in the container without having to remove the lid.

A guide plate 16 is supported within the container by a suitable support means 17 which may be a cylindrical member or which may be legs, in each case the support means extending downwardly from the underside of the lid 14. Vertically spaced openings 18, 18′ are provided in the lid 14 and guide plate 16, respectively, and tubes 19 which extend through the openings 18, 18′ may be supported by frictional contact in these openings. Optionally the tubes 19 may extend all the way to the bottom of container 11 or they may be supported by contact therewith. Such tubes 19 have the lower ends thereof perforated and such perforated portions 20 extend to a substantial height within the container 11. Also optionally a support or base may be provided inside of the container 11 having vertical bores therein to receive the lower ends of the perforate portions 20 of the tubes 19.

Above the perforate portions 20 of the tubes 19 the tubes extend straight to a distance above the lid 14 and then such tubes may be curved in any direction desired or they may be curved and recurved and wound around in such manner as to provide necessary mutual support for each other and also to provide an interesting and ornamental patter of intertwisted tubes.

The upper portions 22 of each tube receive the lower rim or connection member 23 thereupon, such connection member being in the form of a cylinder or rim of a cup member 24. Such cup member 24 has a spacer plate or disc 25 therein preferably of a perforate material, such as a plastic mesh 26, as shown in FIG. 2. A rod, bar or wick 27 of some suitable porous material such as cellulose nitrate or "chemical cotton," of high porosity and of great fluid conductivity, is inserted within each tube 19. Such bars 27 extend from substantially the bottom of the tubes up through the perforate portions 20 and upwardly therefrom through the upper portions 22 to some position within the cup 24 just slightly below the plant support plate or disc 25. Thus the roots 28 of a plant 29, which is supported by a disc 25, may extend through the mesh openings 26 and into contact with the top portion of the porous bar or rod 27 to become positively engaged with the porous rod 27 to maintain nutrient reeciving connection therewith whereby the growth and functioning of the roots is maintained and so that the plant 29 is thus properly cultivated in the absence of soil.

The nutrient is generally in the form of a liquid mixture containing the ingredients therein best designed to stimulate the growth of the plants in the cups thereabove and such nutrient 30 generally best stands at a level in the container at the level of the uppermost perforations 21.

The nutrient is varied over a wide range of requirements. Obviously it is not necessary to supply oxygen as a nutrient constituent since the plant obtains this from the air. Nor is it necessary to supply hydrogen except in the form of water which is the carrier for the other elements comprising the nutrient. Also it is not necessary to supply carbon dioxide to the nutrient since the plant manufactures its own carbon dioxide. On the other hand, it is necessary to supply certain major elements such as potassium, calcium, sulphur, magnesium, nitrogen, and phosphorous as various quantities and combinations of these elements may be needed.

Also it is necessary to supply certain trace elements such as iron, manganese, boron, zinc, copper, and molybdenum.

It is well known how these various elements contribute to the growth and particular requirements of various plants. For instance, nitrogen is supplied to stimulate leaf growth, to provide protein and to contribute to protoplasm and chlorophyll formation. Phosphorous is provided to stimulate the growth of the roots, of the fruits of plants and of the flowering elements and also this mineral stimulates cell division and protoplasm growth. Potash is provided to obtain stronger stems and more vivid blooms, to resist disease and to form carbohydrates. Iron is provided to stimulate the formation of chlorophyll, to prevent dieback and to insure sturdy growing plants. Zinc is employed to aid plant metabolism in enzyme systems when this element is employed in combination with other elements herein listed. Manganese abets leaf respiration and oxidation and stimulates vigorous new growth. Copper is added to help plants utilize nitrogen and to aid fruit set. Boron abets bud growth, aids calcium uptake and stimulates the growth of stronger roots and larger fruit.

Magnesium aids blossom set and the setting of the seed. Calcium is provided for root requirements, stimulates root feeders, strengthens cell walls and enhances the translocation of plant sugars. Molybdenum aids fruit set, and sulphur is provided to stimulate plant protein formation and the development of odorous oils for fragrance and flavor.

As a variation of construction a form of disc 25', to be given preference, is shown in FIG. 3 such as a disc made of a fibrous material as pasteboard and the like, having perforations 26' therein so that the roots of a plant will extend through the perforations to engage the upper end of a bar 27 of porous material. Such a disc has capabilities other than that of plant support in that the roots in seeking the upper end of the bar 27 may become embedded in considerable degree in the pasteboard disc 25'. Thus in case it may be desired to replant the plant 29 it may be lifted from the cup 24 together with the disc 25' to which its roots are connected and transplanted to another location.

Also, as the porous cardboard disc 25 can itself absorb nutrient, it may be used to germinate seeds which need only be placed on the disc.

The invention has a large variety of usages and can serve to grow almost any plant desired since the nutrient may be so finely controlled as to provide plants of any species with those elements essential to its developed growth. Also the climatic conditions for best growth can be simulated as in a hot house by installing the apparatus of this invention in such simulated conditions.

The invention is particularly adapted for the apparatus which serves functionally to stimulate the growth of plants. Also, to serve for purposes of ornamentation, on occasion a transparent container 11 may contain therein a nutrient 30 which in itself is of color to lend beauty and contrast. Additionally the tubes 19 may be of transparent plastic and may carry therein colored bars 27 of character to lend ornamentation and display.

In this regard it is pointed out that bars 27 of varied colors may be employed in one container, and also the tubes 19 having these varied colored bars 27 therein may support cups 24 adapted to be provided in various colors and patterns. Additionally, a variety of types of plants may be supported in the cups supported from a single container.

The physical construction of the various elements of the invention lends itself to facile interchangeability of parts. In construction the cups have standard connection rims 23 to fit upon the upper ends of tubes 19 of standard dimensions and thus the cups 24 and tubes 19 are completely interchangeable. Additionally the cups may be removed from the tubes as when the plant has grown to a point where it may be desired to transplant it and in such case it is only necessary to lightly remove the roots from the bar 27, fill the cup with soil, the connecting rim 23 being stuck into the ground, and the roots 28 directed so that they may extend downwardly through the bore 31 in the bottom of the cup to enter the soil therebelow.

The invention admits of a variety of advantages over prior art apparatus heretofore employed in this general field but which equipment did not include a number of features visualized for this invention to solve a number of problems not previously considered. As below:

As the roots of the plants attach to the wick material to act in a way as extension thereof drawing fluid upwardly into the supported plant, only that amount of fluid is drawn upwardly that is required by the plant and thus the cup 24 does not fill up with fluid so that as a consequence it is not necessary to provide drains from the cups. Also it is not necessary to provide a pump or any regulatory fluid delivery device to urge the upflow of the fluid.

As the container contents are diminished only by that amount of fluid required by the supported plants, the fluid level diminishes very gradually so that the container does not need to be frequently replenished. Also when the container is of transparent plastic, the fluid level therein may always be observable or otherwise in cases where the container is now transparent, suitable sight guages may be provided to apprise of the fluid level.

It should be noticed that it is not necessary to remove the lid of the container in order to fill it since the container can be filled through openings 18 in the lid, such an opening being shown provided outwardly of the opening through which the tubes 19 extend and being plugged by the plug 32 until such time as the plug is removed so that the container can be filled. Plugs 32 of the type hereinabove described to close the filling opening may also be employed to close openings 18 in the lid 14 which are not utilized to receive tubes 19 therethrough. Thus excessive evaporation from the container 11 is prevented. In this regard, it is pointed out that in order to obtain the most attractive patterns of tubes it is not intended nor seldom desirable to employ tubes in each opening but a random selection of openings if often preferable in order to admit a scattered and attractive pattern of a plant ensemble.

In cases where variety of color is desirable but not practically obtainable through the use of colored wicks visible through transprent plastic tubes, an alternate arrangement may provide the desired color arrangement through the selection of tubes of a desired color or of various desired colors whereas the wicks therewithin are not visible through the tubes.

As to construction, whereas the tubes shown in the drawing are curved in various arcs and are of various heights, this showing does not impose a limitation on the arrangement of tubes, and patterns of straight tubes may be employed. Also the tubes may be ornamented with various carvings and designs thereon. In this regard, no limitation is imposed upon the shapes of containers, nor upon the shapes of container lids, nor upon the shapes of the cups and any variations from the shapes shown for these elements can be included within the spirit of this invention since the basic requirements are that the container support the tubes and provide fluid access to the wicks therein while the cups are interchangeably fitted on the tops of the tubes but otherwise have no other functional requirements but that of providing a perforated means to support the plants.

In further regard to the cups and their functioning, it is pointed out that the perforated discs on which the plants are placed should preferably be of material other than metal since ungalvanized metal and metal other than stainless steel and the like is subject to corrosion.

Functionally the discs are perforated means which support the plants, carrying out another function in cooperation with the shape of the cups in that they provide a free air space area below the discs through which the roots must pass on their way to make connection to the wick and in this area the roots obtain from the air any oxygen they may require and thus alleviate the invention from any other requirements for aeration.

It is obvious that since various types of plants require various degrees of moisture, it is necessary that there exists interchangeability between wicks of various porosity and thus the invention may best be practiced by providing wicks of the same maximum lengths in the various range of porosities which may be employed, the interchanged wicks then being trimmed from maximum length to fit the various lengths of tubes.

This invention differentiates over other forms of apparatus heretofore employed for the soilless cultivation of plants in that it is a true hydroponicum and does not use sand or gravel in any form; nor does it require that its roots descend directly into the fluid nutrient supply chamber but rather the roots with contact established with the wick serve as extension conduits between the wicks and the plants proper.

The invention is not limited to the structural embodiments shown in the drawings and hereinabove described nor to the sequence of method steps set forth in describing the method of employing the invention, but a wide range of other structures and other method steps may be employed as such may fall within the broad spirit of the invention and within the broad scope of interpretation claimed for and merited by the appended claims.

What is claimed is:

1. Apparatus for employment in the soilless hydroponic culture of plants comprising a container having water therein, a closure therefor having openings therethrough, a plurality of tubes having perforate lower portions, said tubes extending sealably through said openings a substantial distance above said closure and in guidably supporting frictional contact with said openings, said container being of sufficient height to contain enough water to substantially attain the upper level of said perforations, a liquid including water filling said container to substantially the upper level of said perforations, a porous wick material filling said tubes from the lower portions thereof upwardly through the tops thereof, cups installable upon the tops of said tubes, said tubes forming the support means for said cups and being sufficiently rigid therefor, and mesh plant supporting means in said cups to support plants above said wick material with roots thereof extending downwardly through the mesh for access to said wick material whereby the plants are nourished for growth by inorganic nutrient material passing upwardly through said porous wick material.

2. Apparatus for employment in the soilless hydroponic culture of plants comprising a container having water therein, a closure therefor having openings therethrough, a plurality of tubes having perforate lower portions, said tubes extending sealably through said openings a substantial distance above said closure and in guidably supporting fracitional contact with said openings, said container being of sufficient height to contain enough water to substantially attain the upper level of said perforations, water filling said container to substantially the upper level of said perforations, a porous wick containing nutrient material filling said tubes from the lower portions thereof upwardly through the tops thereof, cups installable upon the tops of said tubes, said tubes forming the support means for said cups and being sufficiently rigid therefor, and mesh plant supporting means in said cups to support plants above the wick material with roots thereof extending downwardly through the mesh for access to said wick material whereby the plants are nourished for growth by inorganic nutrient material passing upwardly through said porous wick material.

3. Apparatus for employment in the soilless hydroponic culture of plants comprising a container having water therein, a closure therefor having openings therethrough, a plurality of tubes having perforate lower portions, said tubes extending sealably through said openings a substantial distance above said closure and in guidably supporting frictional contact with said openings, said container being of sufficient height to contain enough water to substantially attain the upper level of said perforations, a liquid including nutrient material and water filling said container to substantially the upper level of said perforations, a porous wick material filling said tubes from the lower portions thereof upwardly through the tops thereof, cups installable upon the tops of said tubes, said tubes forming the support means for said cups and being sufficiently rigid therefor, and mesh plant supporting means in said cups to support plants above said wick material with roots thereof extending downwardly through the mesh for access to said wick material whereby the plants are nourished for growth by inorganic nutrient material passing upwardly through said porous wick material.

4. Apparatus for employment in the soilness hydroponic culture of plants comprising a container having water therein, a closure therefor having openings therethrough, a plurality of tubes having perforate lower portions, said tubes extending sealably through said openings and in guidably supporting frictional contact therewith, a liquid including water filling said container to substantially the upper level of said perforations, a porous wick material filling said tubes from the lower portions thereof upwardly through the tops thereof, cups installable upon the tops of said tubes and an absorbent, perforated, fibrous disc as a plant supporting means in said cups to support plants above said wick material with roots thereof extending downwardly through the perforations for access to said wick material whereby the plants are nourished for growth by inorganic nutrient material passing upwardly through said porous wick material.

5. Apparatus for employment in the soilless hydroponic culture of plants comprising a container having water therein, a closure therefor having openings therethrough, a plurality of tubes having perforate lower portions, said tubes extending sealably through said openings and in guidably supporting frictional contact therewith, a liquid including water filling said container to substantially the upper level of said perforations, a porous wick material filling said tubes from the lower portions thereof upwardly through the tops thereof, cups including bores through the bases thereof and circular flanges around said bores therebelow and installable uopn the tops of said tubes, perforate plant supporting means in said cups to support plants above said wick material as said wick material is extended through said bores into said cups, with plant roots thereof extending downwardly for access to said wick material whereby the plants are nourished for growth by inorganic nutrient material passing upwardly through said porous wick material, said tube ends and said flanges being standardized whereby said cups and tubes are interchangeable, and said cups being selectively removable to be filled with soil under said supporting means and said roots directed through said bores into soil into which said flanges may be inserted.

(References on following page)

References Cited in the file of this patent

UNITED STATES PATENTS

| | | |
|---|---|---|
| 108,592 | Hess | Oct. 25, 1870 |
| 249,175 | Hall | Nov. 8, 1881 |
| 1,133,735 | Malone | Mar. 30, 1915 |

FOREIGN PATENTS

| | | |
|---|---|---|
| 453,258 | France | Mar. 31, 1913 |
| 183,168 | Germany | Apr. 2, 1907 |
| 819,017 | Germany | Oct. 29, 1951 |

OTHER REFERENCES

Publication: "Soilless Growth of Plants" (Ellis et al.), second edition, published by Reinhold (N.Y.) 1947; pages 70, 98, 99, 100 relied on.